(12) United States Patent
Wang

(10) Patent No.: US 12,457,128 B2
(45) Date of Patent: *Oct. 28, 2025

(54) DETECTING VLAN MISCONFIGURATION

(71) Applicant: Juniper Networks, Inc., Sunnyvale, CA (US)

(72) Inventor: Jisheng Wang, Palo Alto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/438,138

(22) Filed: Feb. 9, 2024

(65) Prior Publication Data
US 2024/0187279 A1    Jun. 6, 2024

Related U.S. Application Data

(63) Continuation of application No. 17/808,226, filed on Jun. 22, 2022, now Pat. No. 11,902,051, which is a
(Continued)

(51) Int. Cl.
*H04L 12/28* (2006.01)
*G06N 20/00* (2019.01)
(Continued)

(52) U.S. Cl.
CPC ......... *H04L 12/2854* (2013.01); *G06N 20/00* (2019.01); *H04L 12/4633* (2013.01); *H04L 12/4641* (2013.01); *H04L 49/354* (2013.01)

(58) Field of Classification Search
CPC ............. H04L 12/4641; H04L 12/4633; H04L 49/354; H04L 12/2858; H04L 12/46;
(Continued)

(56) References Cited

U.S. PATENT DOCUMENTS 9,955,406 B2    4/2018  Lin et al.
11,388,022 B2 *  7/2022  Wang ............... H04L 41/26
(Continued)

FOREIGN PATENT DOCUMENTS

CN    105340228 A    2/2016
CN    108512678 A    9/2018
(Continued)

OTHER PUBLICATIONS

"European Application Serial No. 20182327.5, Extended European Search Report mailed Dec. 18, 2020", 9 pgs.
(Continued)

*Primary Examiner* — Benjamin H Elliott, IV
(74) *Attorney, Agent, or Firm* — Shumaker & Sieffert, P.A.

(57) ABSTRACT

Disclosed are methods for detecting misconfigured VLANs. In some embodiments, traffic on a VLAN across multiple access points is categorized. Traffic on the VLAN at a single access point is then also categorized. The categorization of the VLAN traffic at the single access point can be in response to, for example, communication errors or other conditions. The two categorizations are then compared to determine if the VLAN traffic at the AP is consistent with the VLAN traffic across a network (e.g., an enterprise network). If the VLAN traffic at the AP is generally consistent with that across the network, this may indicate that a downstream network component, such as a switch or router, is misconfigured. Thus, some embodiments programmatically reconfigure the downstream component to forward traffic for the VLAN.

19 Claims, 8 Drawing Sheets

Related U.S. Application Data continuation of application No. 16/782,568, filed on Feb. 5, 2020, now Pat. No. 11,388,022.

(51) Int. Cl.
   *H04L 12/46* (2006.01)
   *H04L 49/354* (2022.01)

(58) Field of Classification Search
   CPC ............ H04L 41/0686; H04L 41/0816; H04L 41/142; H04L 41/16; H04L 41/26; H04L 12/2854; H04L 43/20; H04L 41/0895; H04L 41/145; H04L 43/0823; H04L 43/087; H04L 43/0888; G06N 20/00
   See application file for complete search history.

(56) References Cited

U.S. PATENT DOCUMENTS

| | | | | |
|---|---|---|---|---|
| 11,902,051 | B2* | 2/2024 | Wang | H04L 41/0816 |
| 2007/0223493 | A1* | 9/2007 | Sridhar | H04L 12/4679 |
| | | | | 370/395.53 |
| 2010/0309820 | A1* | 12/2010 | Rajagopalan | H04L 41/122 |
| | | | | 370/256 |
| 2012/0218893 | A1* | 8/2012 | Natarajan | H04L 41/12 |
| | | | | 370/235 |
| 2014/0112203 | A1* | 4/2014 | Rao | H04L 45/64 |
| | | | | 370/254 |
| 2014/0376558 | A1 | 12/2014 | Rao et al. | |
| 2015/0319042 | A1* | 11/2015 | PalChaudhuri | H04L 12/4641 |
| | | | | 370/395.53 |
| 2015/0333992 | A1* | 11/2015 | Vasseur | H04L 43/0876 |
| | | | | 370/252 |
| 2016/0323163 | A1* | 11/2016 | Abdulnour | H04L 12/66 |
| 2017/0353355 | A1* | 12/2017 | Danait | H04L 41/0893 |
| 2018/0097658 | A1* | 4/2018 | Palchaudhuri | H04L 41/0873 |
| 2018/0212828 | A1* | 7/2018 | Sekhri | H04L 12/4641 |
| 2018/0351791 | A1* | 12/2018 | Nagarajan | H04L 41/0873 |
| 2019/0024113 | A1* | 1/2019 | Head | C12N 15/8286 |
| 2019/0281078 | A1* | 9/2019 | Eguiarte Salazar | H04L 63/162 |
| 2020/0027031 | A1* | 1/2020 | Sampath | G06N 20/00 |
| 2020/0112883 | A1* | 4/2020 | Naik | H04L 47/125 |
| 2020/0295988 | A1* | 9/2020 | Bolding | H04L 41/0886 |
| 2020/0374336 | A1* | 11/2020 | Murgia | H04L 47/2441 |
| 2021/0243051 | A1* | 8/2021 | Wang | G06N 20/00 |
| 2022/0321379 | A1* | 10/2022 | Wang | H04L 12/2854 |
| 2024/0187279 | A1* | 6/2024 | Wang | H04L 41/16 |

FOREIGN PATENT DOCUMENTS

| | | |
|---|---|---|
| CN | 109923883 A | 6/2019 |
| WO | 2014021810 A1 | 2/2014 |

OTHER PUBLICATIONS

"K-means clustering", https: en.wikipedia.org wiki K-means_clustering,(accessed on Jan. 26, 2021), 16 pgs.

Extended Search Report from counterpart European Application No. 23166620.7 dated Jul. 4, 2023, 10 pp.

First Office Action and Search Report from counterpart Chinese Application No. 202010606406.X dated Mar. 30, 2023, 12 pp.

Jander, "Proactive LAN Management", Tools that look for trouble to keep LANs out of danger, Data Communications International 22, New York US, Mar. 21, 1993, 7 pp.

Jander, M, "Proactive Lan Management", Data Communications, Mcgraw Hill. New York, US vol. 22, No. 5, (Mar. 21, 1993), 7 pgs.

Mehdi, Owrang, "An Expert System Based Configuration Design of Hybrid-Ethernet Local Area Network", Decision Aiding for Complex Systems, Charlottesville, Va., (Proceedings of the International Conference on Systems, Man and Cybernetics), New York, IEEE, (Oct. 13, 1991), 807-812.

Notice of Intent to Grant and Text Intended to Grant from counterpart European Application No. 20182327.5 dated Oct. 25, 2022, p. 41.

Office Action, and translation thereof, from counterpart Chinese Application No. 202010606406.X dated Oct. 19, 2023, 6 pp.

Owrang O et al., "An Expert System Based Configuration Design of Hybrid-Ethernet Local Area Network", 1991 IEEE International Conference on Systems, Man and Cybernetics, vol. 2, IEEE, Oct. 13, 1991, pp. 807-812.

Prosecution History from U.S. Appl. No. 16/782,568, dated Aug. 24, 2021 through Mar. 17, 2022, 67 pp.

Prosecution History from U.S. Appl. No. 17/808,226, dated May 9, 2023 through Sep. 26, 2023, 25 pp.

Response to Extended Search Report dated Dec. 18, 2020, from counterpart European Application No. 20182327.5 filed Feb. 9, 2022, 25 pp.

Notice of Intent to Grant and Text Intended to Grant from counterpart European Application No. 23166620.7 dated Mar. 13, 2024, 72 pp.

Response to Extended Search Report dated Jul. 4, 2023, from counterpart European Application No. 23166620.7 filed Feb. 2, 2024, 28 pp.

Extended Search Report from counterpart European Application No. 24195400.7 dated Dec. 19, 2024, 10 pp.

Response to Extended Search Report dated Dec. 19, 2024, from counterpart European Application No. 24195400.7 filed Jul. 21, 2025, 30 pp.

* cited by examiner

DETECTING VLAN MISCONFIGURATION

This application is a continuation of U.S. patent application Ser. No. 17/808,226, filed 22 Jun. 2022, which is a continuation of U.S. patent application Ser. No. 16/782,568, filed 5 Feb. 2020, the entire content of each application is incorporated herein by reference.

FIELD

The present disclosure is generally directed to computer networks. Specifically, disclosed are embodiment that identify misconfigurations of a virtual local area network (VLAN).

BACKGROUND

VLANs are commonly used to segment and isolate traffic over computer networks. Each VLAN creates an environment wherein devices on the same VLAN can exchange messages with each other while preventing devices which are not configured on the said VLAN from being able to view the messages. In this manner VLANs provide a secure communication environment by preventing devices (users) not authorized to communicate over the VLAN from viewing messages or identities of devices (other users) communicated over the VLAN.

BRIEF DESCRIPTION OF THE FIGURES

The example embodiments herein may be better understood by referring to the following description in conjunction with the accompanying drawings in which like reference numerals indicate identically or functionally similar elements, of which.

DETAILED DESCRIPTION

Figure 1:
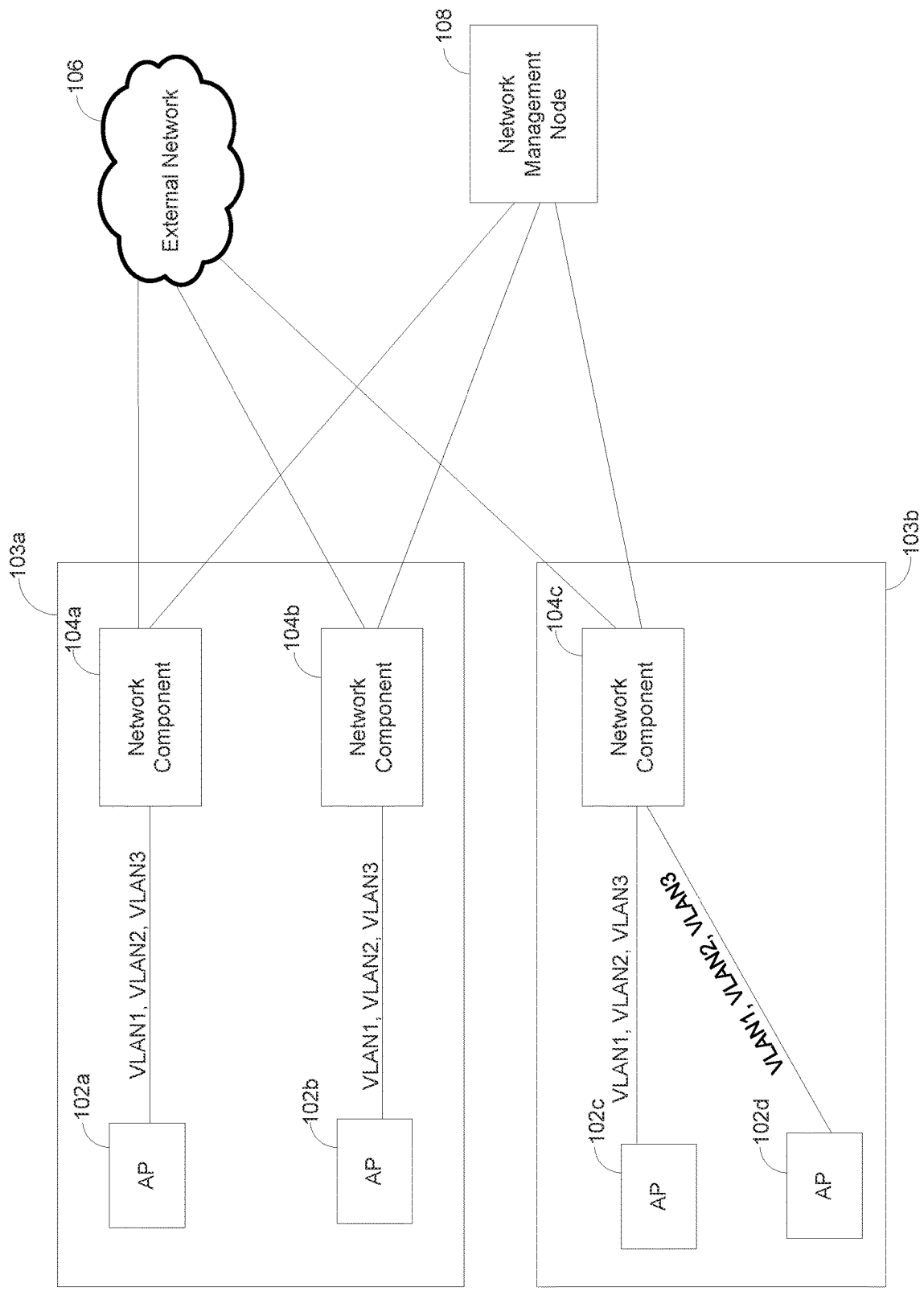
FIG. 1 shows an example computer network implementing one or more of the disclosed embodiments.

VLANs may also be employed, in some embodiments, to allocate network capacity to particular portions of network traffic. For example, some embodiments segment time-sensitive communication (e.g., video) to operate over a first VLAN and bursty data communication (e.g., file transfers) over a second VLAN. Via this segmentation, these embodiments protect the time-sensitive traffic from the deleterious effects of traffic bursts present on the second VLAN. If these two types of traffic share network capacity of a single LAN, the bursty traffic could inhibit the time-sensitive traffic from meeting its delivery time constraints. VLANs are also effective at limiting a scope of broadcast messages. A device on a specific VLAN can send a broadcast message only to other devices on the same VLAN, thus limiting the scope of distribution of messages across the network.

Access points provide wireless devices with a means for accessing computer networks. Traffic exchanged between a wireless device and another remote device typically passes through an access point with which the wireless device is associated and on to an additional network. For example, when a wireless device communicates with another device accessible via the Internet, the AP to which the wireless device is associated forwards traffic destined for the other device to a network. The AP is connected to this other network via a backhaul connection, which can include a wired connection to a backhaul network component, such as a switch, router, or other device having network connectivity to another network.

An AP supporting communication over multiple VLANs may include multiple wired connections to multiple ports of multiple backhaul devices, with each port allocated to one or more VLANs. VLANs allocated to different ports of different backhaul devices typically do not overlap. In other words, a single port on a backhaul device is the only port of the backhaul device configured to pass traffic for a particular VLAN.

Both the APs and backhaul devices maintain configuration information defining which VLANs are supported by which ports. In order for the network to operate properly, these configurations must match or otherwise be compatible. Traffic transmitted over a VLAN is tagged with an identifier of the VLAN. For example, one method of VLAN tagging is defined by the 802.1Q protocol. If a port of a backhaul device receives traffic tagged for a VLAN, and the port is not configured to pass traffic for that VLAN, the backhaul device will drop the traffic, resulting in loss of connectivity by the wireless device (or AP) initiating the communication.

When APs are deployed, their configuration information may sometimes be incorrect. For example, many enterprise customers that manage large numbers of APs use a common VLAN configuration for a large number of APs. This configuration is sometimes deployed via automated scripts that push a common configuration to many APs. This common configuration may be appropriate in a large percentage of AP deployments, but may be inappropriate in particular circumstances. This can result in misconfigurations between APs and backhaul devices to which they are connected.

Configuration problems can also arise when individual backhaul devices are upgraded or replaced. For example, backhaul device configuration is manually configured in some customer environments, with human mistakes in backhaul device configuration resulting in misconfigurations. For example, a human technician can, in some cases, attach a physical connection between an AP and a backhaul device incorrectly. For example, a first port of an AP is connected to a second portion of a backhaul device in some embodiments, whereas the correct configuration would attach the first port of the AP to a third port of the backhaul device.

The disclosed embodiments provide for improved methods of detecting misconfigurations between an access point and a network component. In some embodiments, traffic communicated over each VLAN in an enterprise is categorized into one of a plurality of categories. The categorization of each VLAN is obtained based on traffic passed by multiple access points over the VLAN. In some embodiments, these multiple access points are physically located at a common customer location. Alternatively, the multiple access points may include some access points located at different customer sites. An example of these categories, as implemented by at least one of the disclosed embodiments, is provided below in Table 1:

TABLE 1

| Category | Traffic Pattern |
| --- | --- |
| Continuous Traffic | Relatively continuous traffic |
| Intermittent Traffic | Periodic or bursty traffic patterns |
| Site specific | VLAN only active on particular site. Inactive on other sites |
| Blackhole | Low volume authentication failures |

Table 1 illustrates that VLAN traffic can be characterized as generally continuous in nature, intermittent or bursty, only on particular customer sites (e.g., site-specific VLANs), or unauthorized or unapproved. These categories are not necessarily mutually exclusive. For example, a VLAN that passes intermittent traffic may also be site-specific. In some embodiments, categorization of VLAN traffic is performed by a machine learning algorithm.

In order to categorize a VLAN, various embodiments rely on one or more feature parameters that provide a partial characterization of VLAN traffic. These feature parameters are selected from a count of how many different customer sites (and VLAN identifiers of those sites) experience traffic over a specific VLAN (e.g., this indicates whether a VLAN is specific to certain sites or not), a percentage of time a VLAN carries some traffic, an amount of traffic carried by the VLAN within a time period, or a number of packets carried by the VLAN during a time period. The percentage-of-time feature is determined, in various embodiments, using a predetermined time period duration. For example, to determine the percentage, a Boolean indicator of whether any traffic was passed during a time period of the predetermined duration is determined. An additional Boolean indicator is determined for a subsequent time period of the predetermined duration. Multiple Boolean indicators are determined in this manner. Then, an average value of the multiple Boolean indicators is determined.

These features are provided to a machine learning model in order to characterize the VLAN, at least in some embodiments. In some embodiments, a K-Means unsupervised clustering algorithm is used to categorize each VLAN. However, other unsupervised clustering may be used in other embodiments. Once each VLAN is categorized based on data passed by multiple access points, these categories can be used to determine if VLAN traffic at a particular single access point has a profile similar to that indicated by the VLAN's multiple AP category, or if the traffic at that access point is atypical for the identified VLAN, as discussed further below.

When an access point experiences communication errors for a particular VLAN, the VLAN traffic at the access point is also categorized. This second single AP categorization is used to determine if the traffic experienced by the single AP for the VLAN is typical of traffic experienced on that VLAN by other devices included in an enterprise. This determination is made by comparing the traffic profile at the single AP to that developed from traffic passed over multiple APs. In some embodiments, traffic from the single AP is included in the multi-AP categorization.

If the traffic profile or category of traffic experienced at the single AP matches that of the VLAN's category (e.g., determined based on traffic throughout the enterprise), then this tends to indicate that there is a misconfiguration between the AP and the network component responsible for forwarding the AP's VLAN traffic. If the AP's traffic profile does not match that of the VLAN, then there may be other configuration issues that require a human technician to resolve. For example, the AP itself can be misconfigured such that it is routing incorrect traffic over the VLAN.

One particular type of VLAN is commonly established to provide a destination for unauthorized network traffic. For example, when a client or wireless terminal initiates communication over a wireless network via an access point, the client typically authenticates against an authentication directory (e.g., RADIUS, active directory, etc.). In some cases, a successful authentication process identifies a VLAN to which traffic from the client/wireless terminal is to be assigned. This assignment is stored at the AP to which the client is associated. When the AP receives traffic from this particular client, the AP tags the traffic with the assigned VLAN, and communicates the traffic over a port of the AP that is assigned to the VLAN. For proper operation, both the AP and the port on a network component to which the AP is connected must be configured to support said VLAN. If either the AP or the port is not configured to carry traffic tagged for said VLAN, traffic from the client is not properly sent to its destination.

If the client does not successfully authenticate to the wireless network, the AP blocks messages from that client. In some embodiments, the blocking of messages from an unauthenticated client is achieved by forwarding messages from that client to a pre-assigned VLAN that is designated for blocked or unauthenticated clients/wireless terminals. VLANs of this type are referred to as black-hole VLANs. A black-hole VLAN is assigned a particularly distinctive VLAN identifier in some embodiments (e.g., 999). In these embodiments, an ID of a black-hole VLAN is intentionally not configured to properly communicate on any network component ports. This results in messages from unauthenticated clients being dropped at the network component.

Returning to the discussion of a comparison between a multi-AP categorization of VLAN traffic and a categorization of the VLAN traffic at a single AP, when consistency between traffic experienced at the AP and a VLAN assigned to the traffic is found (e.g., the categorizations are equivalent), and communication errors at the access point are also identified, some embodiments automatically reconfigure a backend component to forward traffic provided by the AP over the VLAN (e.g., the automatic reconfiguration is achieved in some embodiments via an API provided by the backend component manufacturer). Some embodiments may generate an alert, for example, via any messaging technology such as email, text, or other messaging technology. The alert is generated to include one or more of an identification of the VLAN experiencing errors, an identification of the AP experiencing the errors, one or more indications of the errors themselves (e.g., failed connections, lack of throughput, etc.), an indication of whether the VLAN traffic at the AP is consistent with the VLAN traffic across the site, and a recommended action. The recommended action may include one or more of changing a cable configuration between the AP and a network component, changing a VLAN configuration for the network component.

FIG. 1 shows an example computer network implementing one or more of the disclosed embodiments. FIG. 1 shows four access points (APs) 102*a-d*. Two access points (102*a-b*)

are located at a first customer site 103*a*. Two other access points (102*c*-*d*) are located at a second customer site 103*b*. The first customer site 103*a* and second customer site 103*b* are controlled by the same entity, forming an enterprise network. Each of the access points 102*a*-*d* is in communication with a network component 104*a*-*c*. For example, each of access point 102*a* and access point 102*b* is in communication with network component 104*a* and network component 104*b* respectively. Each of access point 102*c* and access point 102*d* is in communication with network component 104*c*.

Each of the APs 102*a*-*d* is configured to communicate data over three VLANs, identified as VLANs VLAN1, VLAN2, and VLAN3. FIG. 1 shows that each network component 104*a*-*c* is in communication with an external network 106, such as the Internet. Each network component 104*a*-*c* is configured to forward data communication initiated by wireless terminals (not shown) associated with any of the access points 102*a*-*d* to destination devices that are accessible via the external network 106. Similarly, each network component 104*a*-*c* receives data communication destined for any of the APs 102*a*-*d* or a wireless terminal (not shown) associated with one of the APs 102*a*-*d*. The network components 104*a*-*c* forward such data to an appropriate AP 102*a*-*d* as required. Each network component 104*a*-*c* is also in communication with a network management node 108. Note the network management node 108 may sometimes be accessible to the network components 104*a*-*c* via the external network 106.

The network management node 108 collects VLAN activity information from each of the APs 102*a*-*d*. For example, the APs 102*a*-*d* are configured, in some embodiments, to maintain statistical information that characterizes network traffic exchanged over each of the VLANs to which they are connected (e.g., any one or more of VLAN1, VLAN2, or VLAN3). This statistical information can include, for example, a data throughput of the VLAN (e.g., MB/sec), a packet throughput of the VLAN (e.g., packets/sec), a measurement of traffic consistency of the VLAN (e.g., how many time periods out of N time periods activity was detected). In some embodiments, these metrics are determined at the respective AP and forwarded to the network management node 108. In some other embodiments, the network management node 108 determines these metrics based on raw data provided by the APs. For example, the APs provide, in some embodiments, periodic indications of one or more of total packet counts and total data counts (inbound and/or outbound). From this information, the network management node 108 then determines the indications of data throughput, packet throughput, and VLAN traffic consistency as described above. Other characterizations of VLANs are also computed in various embodiments. For example, typical error rates, latencies, or jitter are determined in some embodiments. In some embodiments, hourly or other time-based profiles are determined for each VLAN. For example, data throughput by hour is determined in some embodiments.

In some embodiments, the indications discussed above, including one or more of packet throughput, data throughput, and traffic consistency, are determined for a single site or for multiple sites, or both, by the network management node 108. These indications are then used by various embodiments to characterize each of the VLANs operating within a network. These characterizations are referred to within this disclosure as multi-AP categorization or multi-AP characterization since they are based on VLAN traffic activity measured by at least two access points. As discussed above, in some embodiments, these multi-AP categorizations of VLANs are determined by a machine learning model or by other clustering methods.

Figure 2:
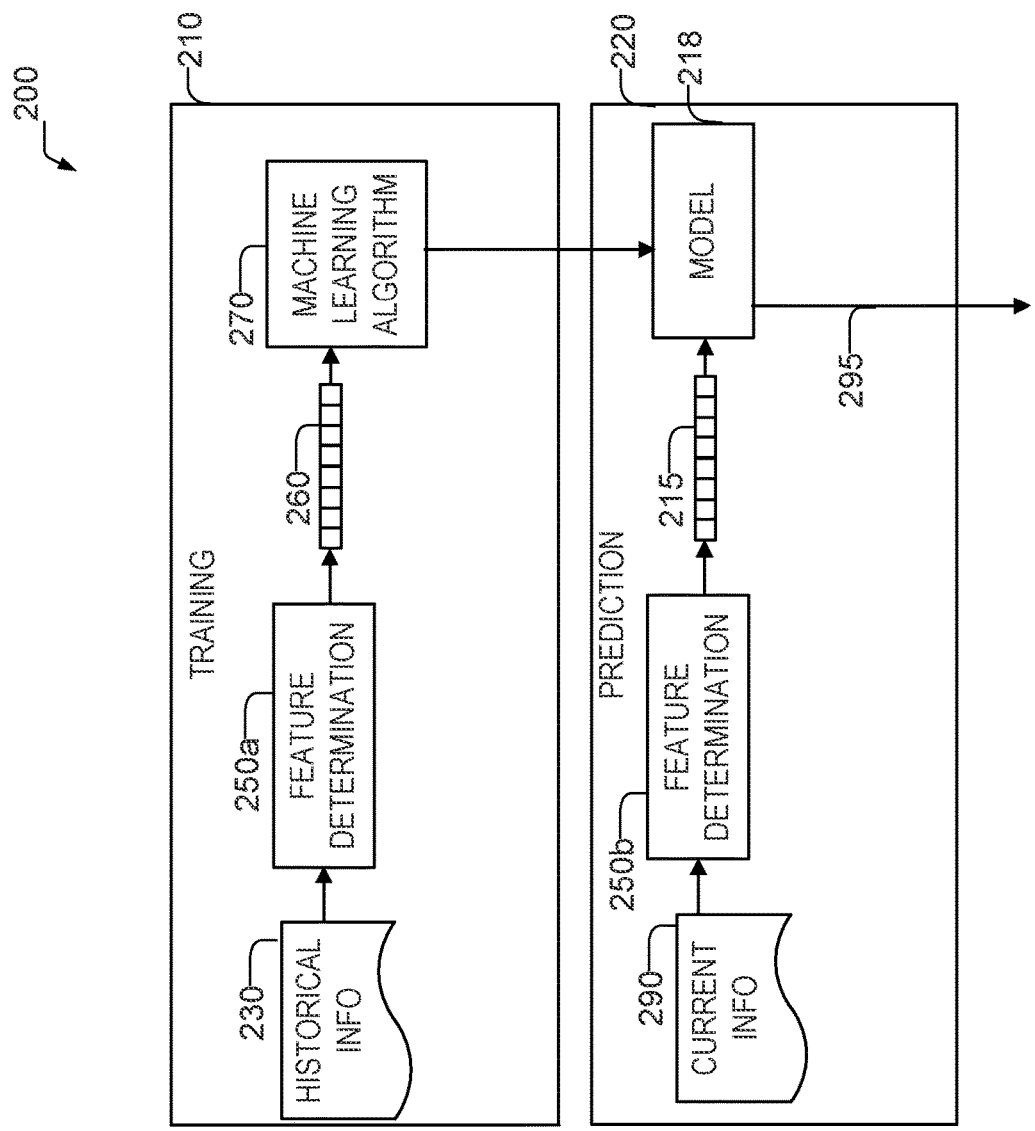
FIG. 2 shows an example machine learning module according to some examples of the present disclosure.

FIG. 2 shows an example machine learning module 200 according to some examples of the present disclosure. Machine learning module 200 utilizes a training module 210 and a prediction module 220. Training module 210 inputs historical information 230 into feature determination module 250*a*. The historical information 230 may be labeled. Example historical information may include one or more of the indications discussed above, such as a site indication, an indication of data throughput, an indication of packet throughput, and an indication of traffic consistency. These indications are stored in a training library of communication statistics in some embodiments. Labels included in the training library indicate which VLAN (e.g., VLAN ID) is associated with the indications.

Feature determination module 250*a* determines one or more features 260 from this historical information 230. Stated generally, features 260 are a set of the information input and are determined to be predictive of a particular outcome. In some examples, the features 260 may be all the historical activity data, but in other examples, the features 260 may be a subset of the historical activity data. The machine learning algorithm 270 produces a model 218 based upon the features 260 and the label.

In the prediction module 220, current information 290 may be input to the feature determination module 250*b*. The current information 290 in the disclosed embodiments include similar indications of that described above with respect to the historical information 230. However, the current information 290 provides these indications for VLAN activity at a single access point. For example, if VLAN activity at the single access point meets a predefined criterion, such as a criterion that detects a number of communication errors above a threshold or other conditions indicative of VLAN configuration problems, activity of the VLAN at the access point is provided to the prediction module 220.

Feature determination module 250*b* may determine the same set of features or a different set of features from the current information 290 as feature determination module 250*a* determined from historical information 230. In some examples, feature determination module 250*a* and 250*b* are the same module. Feature determination module 250*b* produces feature vector 215, which is input into the model 218 to generate a likelihood of response score 295. The training module 210 may operate in an offline manner to train the model 218. The prediction module 220, however, may be designed to operate in an online manner. It should be noted that the model 218 may be periodically updated via additional training and/or user feedback.

The machine learning algorithm 270 may be selected from among many different potential supervised or unsupervised machine learning algorithms. Examples of supervised learning algorithms include artificial neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, linear regression, logistic regression, hidden Markov models, models based on artificial life, simulated annealing, and/or virology. Examples of unsupervised learning algorithms include expectation-maximization algorithms, vector quantization, and information bottleneck method. Unsupervised models may not have a training module 210. In an example embodiment, a regression model is used and the model 218 is a vector of coefficients corresponding to a learned importance for each of the features in the vector of features 260, 215. In some embodiments, to calculate a score, a dot product of the feature vector 215 and the vector of coefficients of the model 218 is taken.

Figure 3:
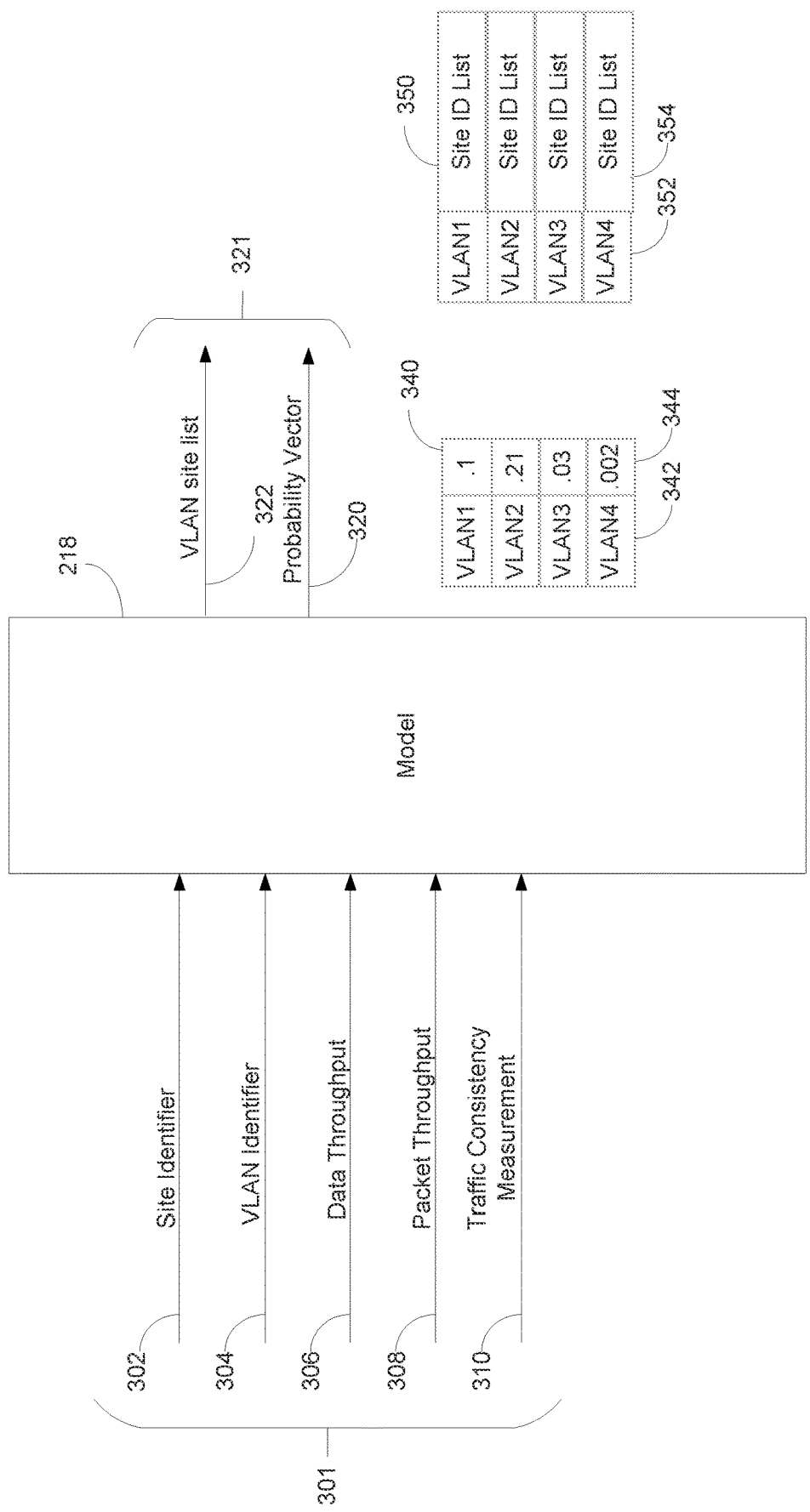
FIG. 3 shows data flow of one embodiment of a model in one or more of the disclosed embodiments.

FIG. 3 shows data flow of a model in one or more of the disclosed embodiments. FIG. 3 shows one embodiment of a model 218. The model 218 receives inputs 301 and generates outputs 321. The inputs 301 include data defining a VLAN site identifier 302, a VLAN identifier 304, an indication of VLAN data throughput 306 (e.g., average amount of data passed on the VLAN over a time period), an indication of packet throughput (e.g., number of packets/time) 308, and an indication of VLAN traffic consistency 310. While FIG. 3 shows these inputs 301 flowing directly into the model 218, one of skill would recognize that in some embodiments, the inputs 301 are pre-processed into features, such as the feature vector 260 discussed above with respect to FIG. 2, before being provided to the model 218.

As discussed above, a traffic consistency indication of a VLAN is determined, in at least some embodiments, based on a series of Boolean indications, with each Boolean indication indicating whether the VLAN passed any traffic during a respective time period. The length of the time period(s) may vary by embodiments. These Boolean indications are then averaged to determine the indication of consistency. Based on the inputs 301, the model 218 generates a probability vector 320. The probability vector 320 indicates a series of probabilities, each of the probabilities representing a likelihood that the traffic observed on the VLAN (indicated by the identifier 304) is of a particular type. FIG. 3 shows an example probability vector 340. The example probability vector 340 includes pairs of values. A first value 342 of each pair of values identifies a particular VLAN (e.g., via a VLAN identifier such as VLAN identifier 304). A second value 344 of the pair of values indicates a probability that the VLAN identified via inputs 301 is of the type indicated by the corresponding first value 342.

When training the model 218, the VLAN identifier 304, indicating a VLAN associated with the other input values 302, 306, 308, and 310, is considered a label for the other inputs 302, 306, 308, and 310. When employing the model 218 to classify unknown network activity (e.g., current information 290 of FIG. 2), the VLAN identifier 304 is considered as only an advisory indication by the model 218, but is not authoritative with respect to the traffic information being provided via the inputs 301. Thus, the probabilities included in the probability vector 320 do not necessarily indicate a highest probability VLAN (e.g., in the vector 320) as being the VLAN indicated by VLAN identifier 304. If the VLAN indicated by VLAN identifier 304 is not the highest probability VLAN indicated by the probability vector 320, then this may be an indication that the VLAN indicated by VLAN identifier 304 is misconfigured.

The model 218 is also shown providing a VLAN site list 322 as an output. An example VLAN site list is shown as 350 in FIG. 3. Each entry in the VLAN site list 350 includes a VLAN identifier 352 and a list of sites 354 supporting the VLAN. The VLAN site list 350 can be utilized in at least some of the embodiments to determine if a particular VLAN is compatible with a particular site as further discussed below. Some embodiments do not support an explicit VLAN site list, such as the example 350. In these embodiments, VLAN site compatibility is reflected in the probability vector 320. In one example, training data for the model 218 indicates a particular VLAN is compatible with or active on a first set of enterprise sites. The model 218 is then provided with a set of inputs indicating activity on the particular VLAN at a different site not included in the first set of enterprise sites. Given the training data, the model 218 generates an output indicating a relatively lower probability that the set of inputs are consistent with the particular VLAN, at least partly based on the mismatch between the site generating the VLAN activity (e.g., identifier 304) and the training data.

Figure 4:
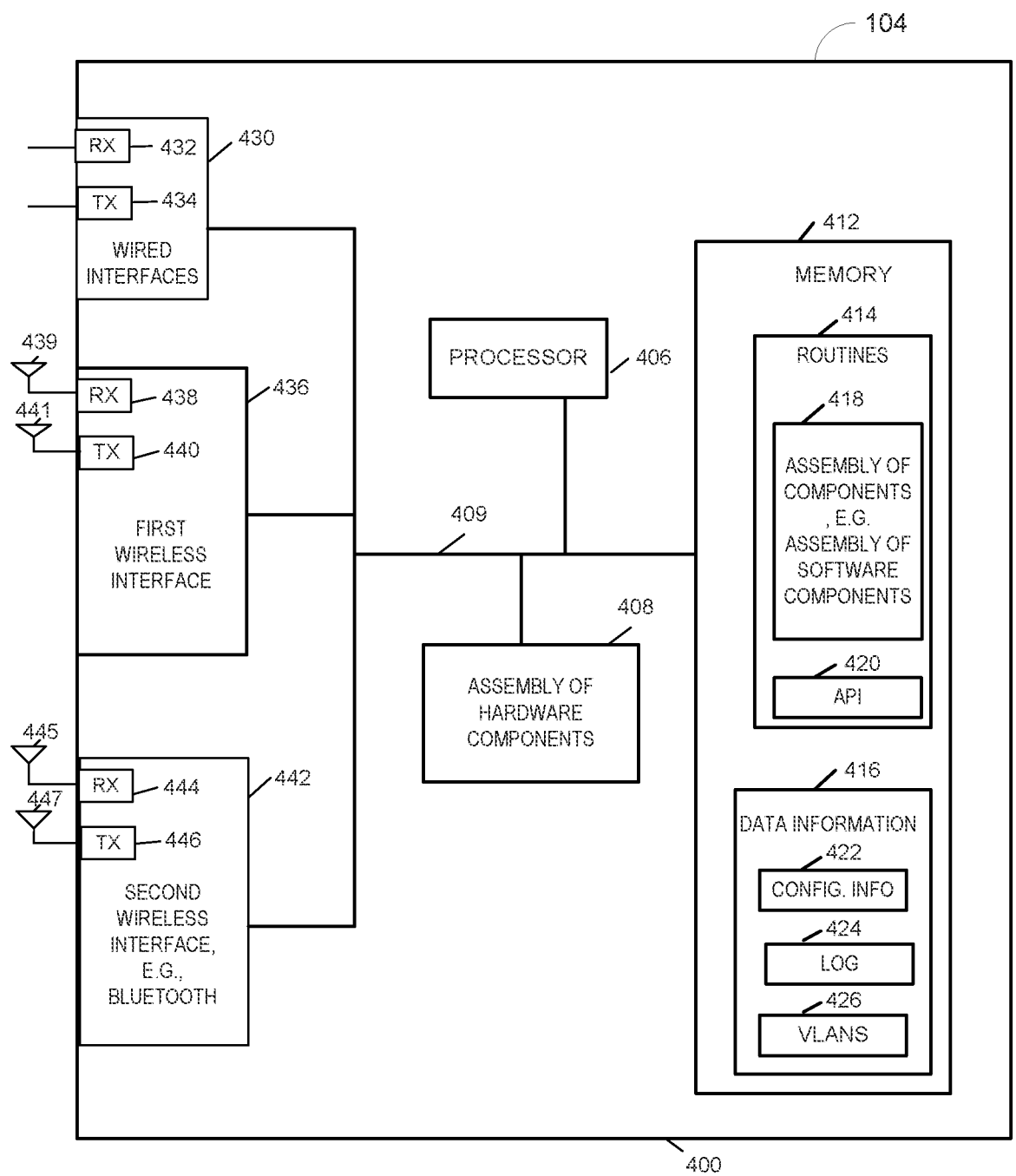
FIG. 4 shows an example access point (e.g., equivalent to any one or more of access points discussed with respect to FIG. 1).

FIG. 4 shows an example access point 400 (e.g., equivalent to any one or more of access points 102a-d discussed above with respect to FIG. 1). Access point 400 includes wired interfaces 430, wireless interfaces 436, 442, a processor 406, e.g., a CPU, a memory 412, and an assembly of modules 408, e.g., assembly of hardware components, e.g., assembly of circuits, coupled together via a bus 409 over which the various elements may interchange data and information. Wired interfaces 430 include receiver 432 and transmitter 434. The wired interfaces 430 couple the access point 400 to a network and/or the Internet 106 of FIG. 1. First wireless interfaces 436 may support a Wi-Fi interface, e.g., IEEE 802.11 interface, and include receiver 438 coupled to receive antenna 439, via which the access point may receive wireless signals from communications devices, e.g., wireless terminals, and transmitter 440 coupled to transmit antenna 441 via which the access point may transmit wireless signals to communications devices, e.g., wireless terminals. Second wireless interface 442 may support Bluetooth® interface which includes receiver 444 coupled to receive antenna 445, via which the access point may receive wireless signals from communications devices, e.g., wireless terminals, and transmitter 446 coupled to transmit antenna 447 via which the access point may transmit wireless signals to communications devices, e.g., wireless terminals.

Memory 412 includes routines 414 and data/information 416. Routines 414 include assembly of modules 418, e.g., an assembly of software modules, and an Application Programming Interface (API) 420. Data/information 416 includes, in some embodiments, configuration information 422, captured traffic statistics 424 and a dynamic list of supported VLANs 426 for tagging messages from clients associated with the AP.

Figure 5:
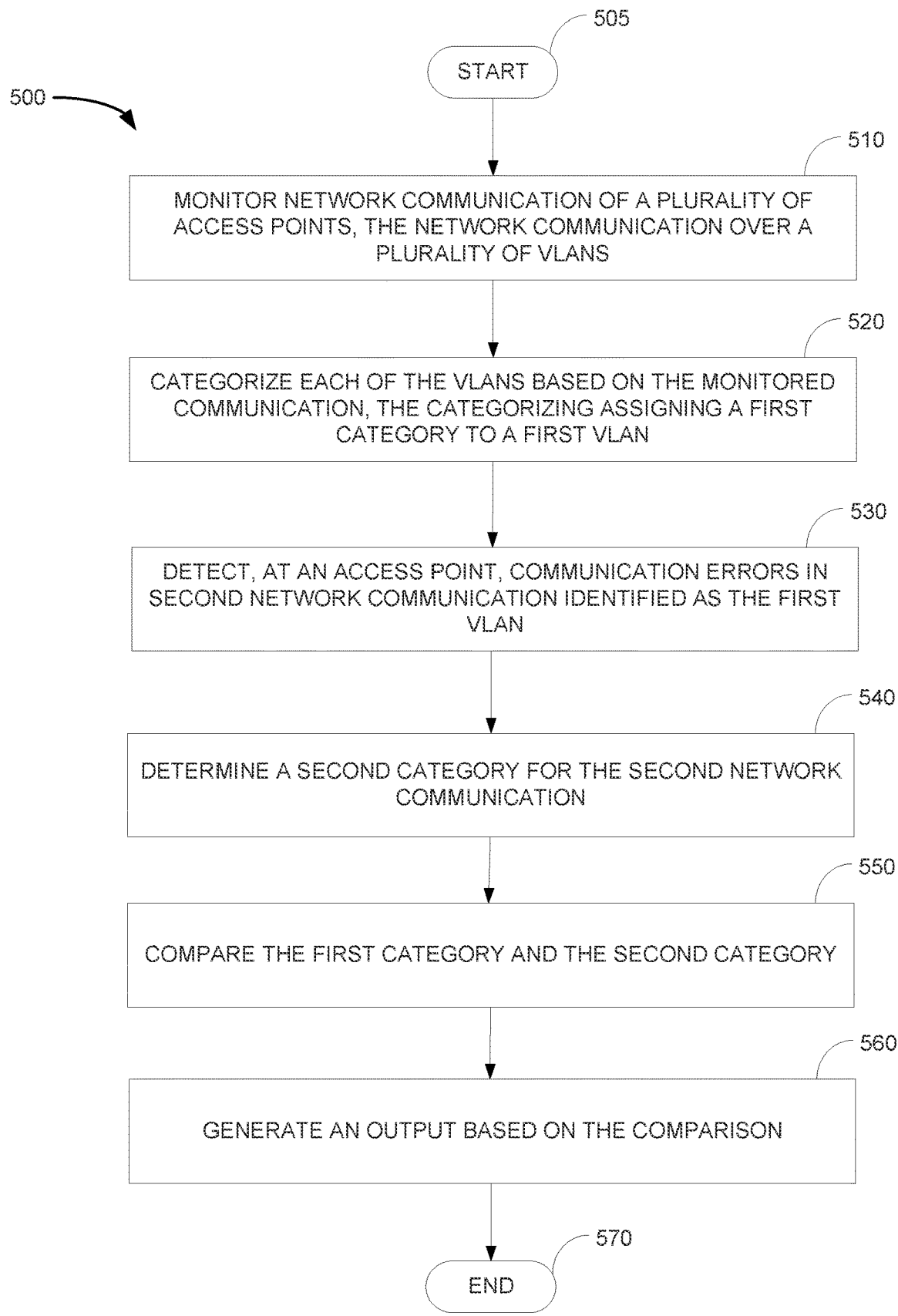
FIG. 5 is a flowchart of a process for determining whether an AP VLAN is misconfigured.

FIG. 5 is a flowchart of a process 500 for determining whether a VLAN at an access point is misconfigured. In some embodiments, one or more of the functions or operations discussed below with respect to FIG. 5 are performed by hardware processing circuitry (e.g., 802 discussed below or 406 discussed above). For example, in some embodiments, instructions (e.g., 824 below and/or 414 discussed above) stored in one or more electronic memories (e.g., 804 and/or 806 discussed below and/or 412 discussed above) configure the hardware processing circuitry to perform one or more operations discussed below with respect to FIG. 5. In some embodiments, process 500 discussed below with respect to FIG. 5 is performed by the network management node 108, discussed above with respect to FIG. 1.

At operation 505, the process 500 begins. In operation 510, network communications over a plurality of uniquely identified VLANs are monitored. For example, as discussed above with respect to FIG. 1, the disclosed embodiments monitor traffic that flows over multiple or a plurality of different VLANs. As discussed above with respect to FIG. 1, some embodiments deploy a common VLAN identifier across multiple deployment sites, such as multiple customer physical locations. In one example, a customer maintains a VLAN identified as VLAN100 at both a Seattle and San Diego office. The VLAN is identified via a unique identifier (e.g., 888) or a unique name (VLAN100). Traffic flowing over a commonly identified VLAN across multiple sites of a customer deployment is grouped or an association of this traffic is otherwise preserved. For example, the monitoring in operation 510 stores indications of the traffic in a data store. In some embodiments communication statistics of network communications occurring over each of the VLANs are maintained and/or obtained. Communication statistics can include, for example, average and/or media latencies, data throughput indications, jitter, traffic types, periodicity, network traffic consistency, or other statistics. As part of the stored indications and/or communication statistics, an identifier of the VLAN over which the traffic flowed is also stored. This provides for later recovery of traffic or traffic statistics obtained from a commonly identified or labeled VLAN.

In operation 520, traffic flowing over each of a plurality of VLANs is categorized, resulting in a corresponding plurality of VLAN categorizations. As discussed above, some embodiments utilize a machine learning model to characterize traffic flowing over a commonly identified VLAN. Thus, the collected communication statistics and/or indications of traffic flowing over an identified VLAN are provided to the machine learning model. The traffic flowing over the commonly identified VLAN may be monitored from multiple sites. As discussed above with respect to FIG. 3, features generated based on traffic flows of each VLAN are provided as input (e.g., 301) to a machine learning model in some embodiments. The features generated in operation 520 in these embodiments include one or more of an indication of a site generating the VLAN traffic, an identifier assigned to the VLAN, an indication of data throughput of the VLAN, an indication of packet throughput of the VLAN, and an indication of traffic consistency on the VLAN. The categorizing of the plurality of VLANs in operation 520 assigns a first category to a first VLAN of the plurality of VLANs. The categorizations of operation 520 are referred to as multi-AP categorizations, in that the categorization of each VLAN in operation 520 considers traffic information on a particular VLAN provided by at least two different access points. These at least two different access points can be located at a single customer site (e.g., APs 102*a*-*b*) or at different customer sites (e.g., APs 102*a* and 102*c* or 102*d*.)

In operation 530, communication errors in second network communications are identified. The communication errors occur on the first VLAN (of the plurality of VLANS). The communication errors are detected at an access point attempting to communicate on the first VLAN. The AP configuration indicates the second network communications are appropriate for the first VLAN. The communication errors are detected at a particular access point that is located at a particular site. In some embodiments, operation 530 generates features as described above based on traffic received at the particular access point. Thus, for example, operation 530 generates, in various embodiments, one or more of an indication of a site location of the access point, an indication of an identifier of a VLAN experiencing the communication errors, data throughput of the VLAN experiencing communication errors, an indication of packet throughput at the VLAN experiencing communication errors, or an indication of traffic consistency of the VLAN experiencing communication errors.

In operation 540, the second communication indicated for the first VLAN is categorized. In some embodiments, the second data communication is categorized using a machine leaning model (e.g., providing inputs 301 to the model 218 as discussed above with respect to FIG. 3). In some aspects, the first VLAN is categorized using other methods, such as one or more clustering methods.

In operation 550, a comparison between the first category and the second category is performed. The comparison is made to determine whether the first category and the second category are equivalent. For example, in some embodiments, a determination is made that the first VLAN is misconfigured at the first AP if the first category is equivalent to the second category. In some embodiments, if the first and second categories match, then traffic allocated to the first VLAN matches a traffic profile of the first VLAN as observed at, for example, a plurality of other access points. For example, the first categorization of the first VLAN is based on traffic occurring at a plurality of APs and/or a plurality of customer sites, as discussed above with respect to the example deployment illustrated in FIG. 1. Since the traffic experienced for the first VLAN is generally consistent with the traffic over the first VLAN across an enterprise or categorization domain, the first AP is most likely appropriately configured. However, in some cases, the first AP is receiving traffic for a VLAN that is not provisioned for a site of the first AP. In this case, the first AP is "over provisioned," in that it is attempting to send data over a VLAN at a site that is not proper for the VLAN. Otherwise, if the first and second categories match, and the site of the first AP is appropriate for the first VLAN, some embodiments conclude that the communication errors are caused by a misconfiguration of a network component, such as a switch or router attached to the first AP. For example, while the first AP is configured to pass traffic for the first VLAN, the network component is not similarly configured. In another circumstance, the packet errors may be appropriate. For example, some embodiments maintain a particular VLAN as a destination for network traffic that is not authorized for transmission over an enterprise network.

In operation 560, an output is generated based on the comparison of operation 550. For example, if a misconfiguration is detected, the detected misconfiguration is mitigated via the output. For example, in some embodiments a network component, such as a switch, is programmatically reconfigured to resolve a detected misconfiguration. For example, some switches provide application programming interfaces that provide for programmatic reconfiguration. In some embodiments, mitigating a misconfiguration includes generating an alert or a report identifying the suspected misconfiguration. The alert or report is transmitted to a distribution list of recipients so that manual intervention can assist with resolving the problem.

A mismatch between the first and second categories provides an indication of some other circumstance. For example, in this circumstance, the first AP can be misconfigured to route traffic appropriate for a second VLAN over the first VLAN instead.

The process 500 ends at operation 570.

Figure 6:
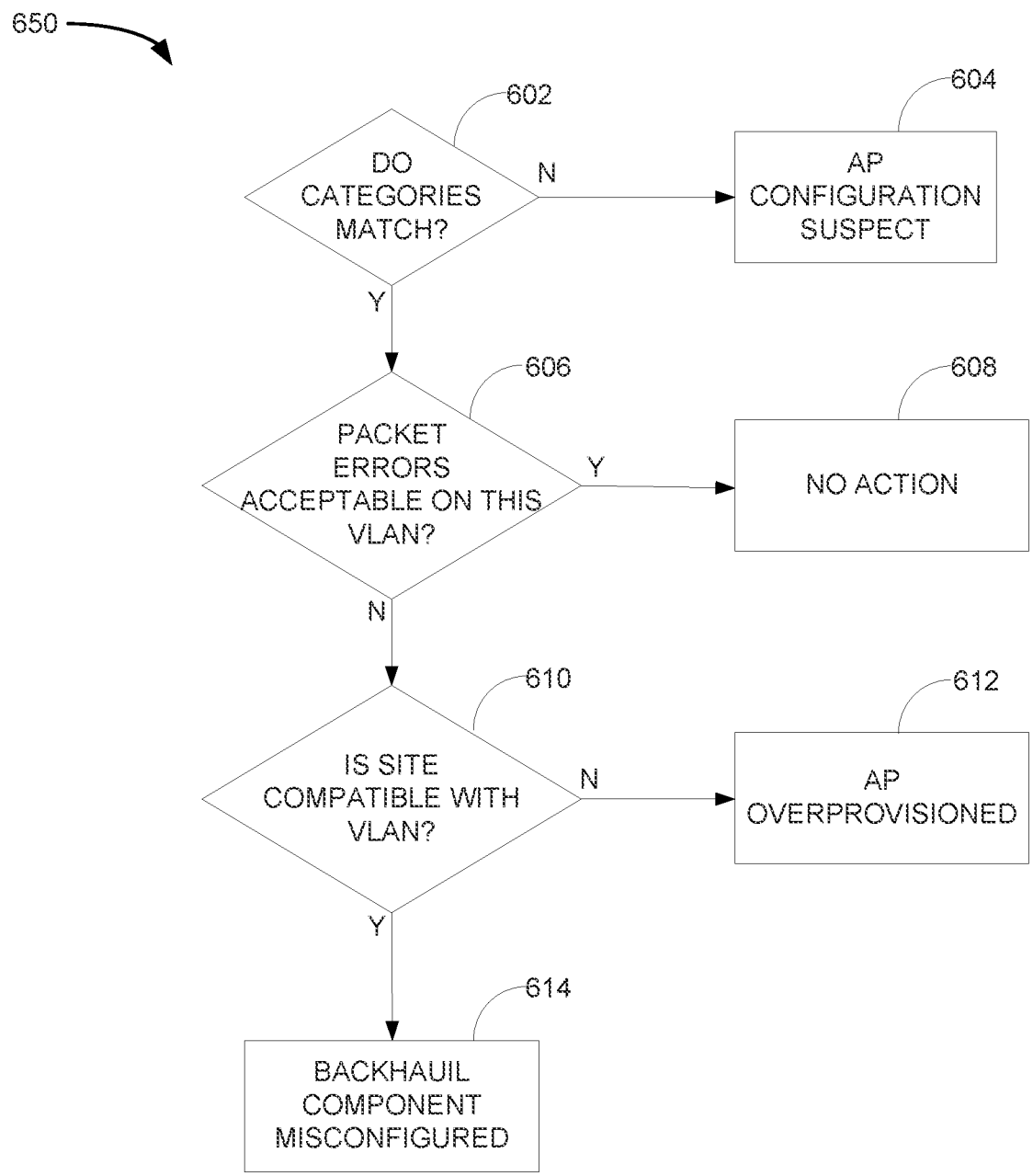
FIG. 6 is a flowchart of a process for determining whether a VLAN is misconfigured based on a multi-AP categorization of the VLAN and a second categorization of network communications allocated to the VLAN by an access point.

FIG. 6 is a flowchart of a process 650 for determining whether a VLAN is misconfigured based on a multi-AP categorization of the VLAN and a second categorization of network communications allocated to the VLAN by an access point. One or more of the functions or operations discussed below with respect to FIG. 6 are performed, in some embodiments, by hardware processing circuitry (e.g., 802 discussed below or 406 discussed above). For example, in some embodiments, one or more hardware memories (e.g., 804 and/or 806 discussed below and/or 412 discussed above) store instructions (e.g., 824 and/or 414 discussed above) that configure the hardware processing circuitry to perform operations or functions discussed below with respect to FIG. 6. In some embodiments, process 650 discussed below with respect to FIG. 6 is performed by the network management node 108, discussed above with respect to FIG. 1.

Decision operation 602 determines whether the first and second categories match. The first category indicates a categorization of a VLAN's (e.g., having a VLAN ID) traffic across multiple access points (and possibly multiple customer sites in some embodiments). The second category indicates a categorization of the VLAN's traffic (e.g., having the VLAN ID) at a particular access point. If the categories do not match, process 650 moves from decision operation 602 to operation 604, which determines that a configuration at the AP may be responsible for the communication errors. As a result, an alert or other output is generated in some embodiments indicating a possible AP configuration error. The alert indicates, in some embodiments, identification of the AP experiencing the communication errors (e.g., one or more of a station address, building location, floor, GPS coordinates, serial number, label identification, or other identifying information). The alert also indicates, in some embodiments, an identifier of the VLAN experiencing the errors, a categorization of the VLAN experiencing categorization error (e.g., indicating a type of traffic experienced on the VLAN), or a VLAN ID of other VLANs matching the traffic experienced by the AP).

If the categories do match, process 650 moves from decision operation 602 to decision operation 606. Decision operation 606 determines if packet errors are acceptable on the indicated VLAN. For example, as discussed above, some organizations designate one or more VLANs for transmission of unauthenticated or unauthorized traffic. These VLANs are sometimes referred to as "blackhole" VLANs. Thus, if the categories match and the VLAN is designated as tolerating packet errors, process 650 moves from decision operation 606 to operation 608, where no action is taken. Operation 608 indicates the communication errors are resulting from forwarding of unauthorized traffic to a blackhole VLAN. Communication errors are to be expected in this configuration.

If the VLAN is not tolerant of packet errors, process 650 moves from decision operation 606 to decision operation 610. Decision operation 610 determines if the site of the AP experiencing packet errors is compatible with or consistent with the indicated VLAN. For example, some multi-site organizations support a particularly identified VLAN at only a portion of the multiple sites. Despite this configuration, APs deployed at a site that does not support the VLAN may still be configured to route traffic over the site-specific VLAN. Thus, the AP configuration in this case is inconsistent with the site's VLAN configuration. This is sometimes a result of a shared AP configuration that is pushed to an AP at a site that does not support a particular VLAN. Thus, if the site is not compatible with the determined VLAN, process 650 moves from decision operation 610 to operation 612, which determines that the AP is overprovisioned. Otherwise, process 650 moves from decision operation 610 to 614. Operation 614 determines that a network component is likely misconfigured. In some cases, since traffic at an AP is consistent with a VLAN profile across multiple APs, it is likely the AP is configured properly, and that the packet errors can be a result of a network component failing to properly forward the VLAN traffic. This can result from a port on a switch or router being improperly connected to the AP, or the port being inappropriately configured such that it does not forward the VLAN traffic. In some embodiments, operation 614 programmatically reconfigures the network component to correct the misconfiguration.

For example, if the network component is not configured to forward traffic for the VLAN, operation 614 reconfigures the network component to pass the VLAN traffic. The reconfiguration is port-specific in some embodiments. For example, in some embodiments, a port number used by the AP to pass the VLAN traffic is used to reconfigure an equivalently numbered port on the network component in some embodiments. In some embodiments, operation 614 consults a standard configuration data structure that defines a mapping from AP port numbers to network component port numbers. Thus, in these embodiments, operation 614 determines a port number used by the AP for the VLAN, and consults the mapping to determine a second port number used by the network component. Operation 614 then, in these embodiments, reconfigures the second port number on the network component to pass the VLAN traffic.

Figure 7:
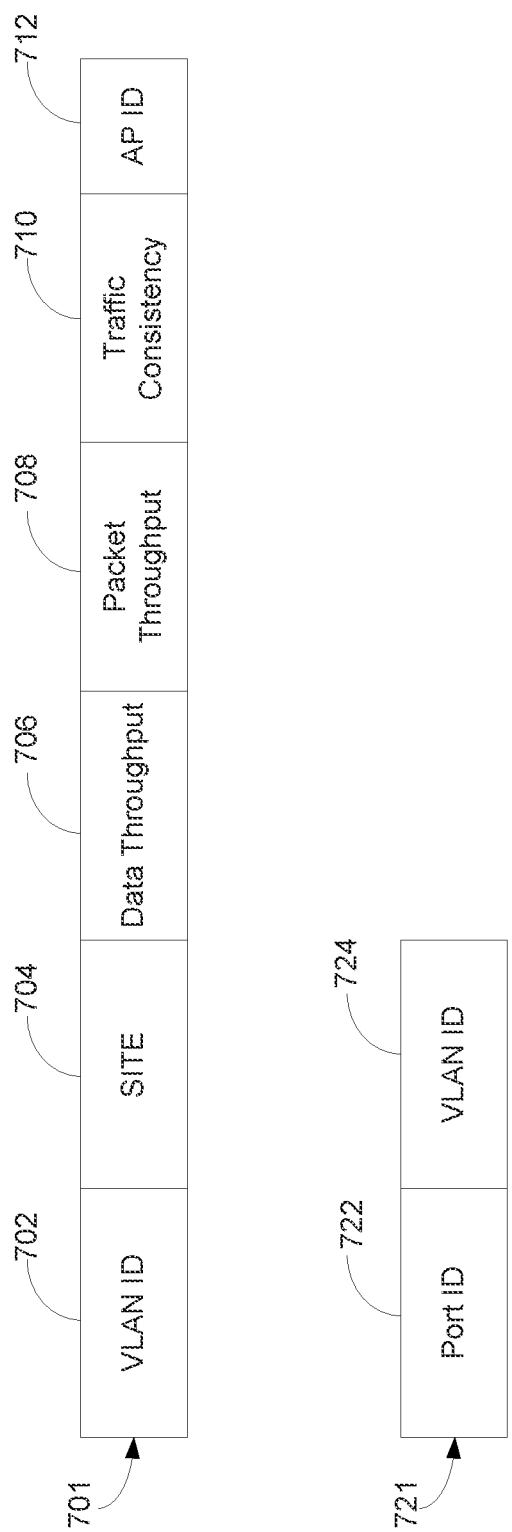
FIG. 7 shows example data structures that are implemented in one or more of the disclosed embodiments.

FIG. 7 shows example data structures that are implemented in one or more of the disclosed embodiments. FIG. 7 shows a communication statistics table 701 and a port configuration table 721. The communication statistics table 701 includes a VLAN identifier field 702, site identifier field 704, data throughput field 706, packet throughput field 708, a traffic consistency field 710, and an AP ID field 712. Entries in the communication statistics table 701 are used, in some embodiments, to generate one or more features for a machine learning model (e.g., 218). In some embodiments, a message indicating the fields of the communication statistics table 701 is passed from an access point (e.g., any one or more of the APs 102a-d) to the network management node 108. The network management node 108 then categorizes the VLAN activity based on the received data.

The VLAN identifier field 702 uniquely identifies a VLAN. The VLAN ID is used, in some embodiments, to form an association between different physical VLANs at different customer sites. In these embodiments, VLANs at different sites that use the same VLAN identifier are categorized as a single VLAN when determining a multi-AP categorization of the VLAN. The site identifier field 704 identifies a customer site from which the data included in a particular "row" of the communication statistics table 701 is derived. The site identifier field 704 is used to distinguish between VLAN activity at different sites. For example, some VLANs may only be operative at a subset of all sites used by a particular enterprise. By tracking site-specific VLAN usage, the disclosed embodiments may better determine whether VLANs are mischaracterized at a particular AP residing at a particular site. The data throughput field 706 indicates a data throughput at the indicated VLAN (indicated by VLAN identifier field 702) at the site indicated by the site identifier field 704. The packet throughput field 708 indicates a packet throughput on the VLAN (indicated by VLAN identifier field 702) at the site (indicated by site identifier field 704). The traffic consistency field 710 provides an indication of traffic consistency over the VLAN (indicated by VLAN identifier field 702) at the site (indicated by site identifier field 704). The AP ID field 712 identifies an access point generating the communication statistics in the particular "row" of the communication statistics table 701.

The port configuration table 721 is implemented, in some embodiments, by one or more of an access point (e.g., any of APs 102a-d) or a network component (e.g., any one or more of 104a-c). Port configuration table 721 includes a port identification field 722 and a VLAN identifier field 724. The port identification field 722 identifies a particular port on a device. For example, any of the access points 102*a-d* and/or network components 104*a-c* include multiple hardware ports in at least some embodiments. Thus, the port identification field 722 is used to identify a specific one of those multiple hardware ports on a device implementing the port configuration table 721. The VLAN identifier field 724 indicates a VLAN that is permitted on the port identified by the field 722. Thus, the port configuration table 721 can include, in some embodiments, multiple entries for a single port when a single port is configured to pass traffic for multiple VLANs. If a VLAN is not indicated for a particular port in a device, then when traffic for that VLAN is received on the port, the traffic is not forwarded, at least in some embodiments.

Figure 8:
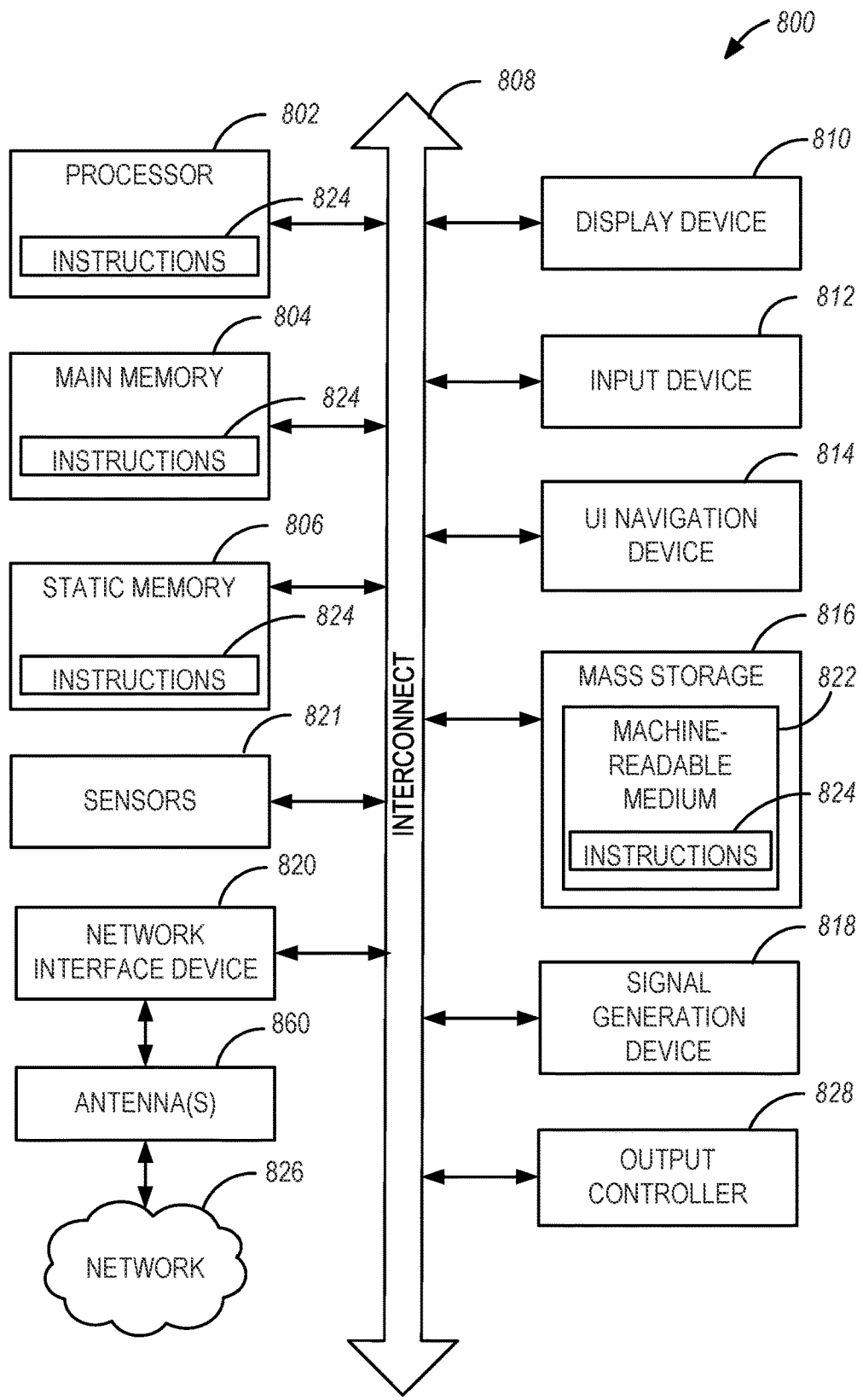
FIG. 8 illustrates a block diagram of an example machine upon which any one or more of the techniques (e.g., methodologies) discussed herein may perform.

FIG. 8 illustrates a block diagram of an example machine 800 upon which any one or more of the techniques (e.g., methodologies) discussed herein may perform. Machine 800 (e.g., a computer system) may include a hardware processor 802 (e.g., a central processing unit (CPU), a graphics processing unit (GPU), a hardware processor core, or any combination thereof), a main memory 804 and a static memory 806, some or all of which may communicate with each other via an interlink 808 (e.g., bus).

Specific examples of main memory 804 include Random Access Memory (RAM) and semiconductor memory devices, which may include, in some embodiments, storage locations in semiconductors such as registers. Specific examples of static memory 806 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 800 may further include a display device 810, an input device 812 (e.g., a keyboard), and a user interface (UI) navigation device 814 (e.g., a mouse). In an example, the display device 810, input device 812 and UI navigation device 814 may be a touch screen display. The machine 800 may additionally include a mass storage device 816 (e.g., drive unit), a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the hardware processor 802 and/or instructions 824 may comprise processing circuitry and/or transceiver circuitry.

The mass storage device 816 may include a machine-readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the mass storage device 816 may constitute machine-readable media.

Specific examples of machine-readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine-readable medium 822 is illustrated as a single medium, the term "machine-readable medium" may include a single medium or multiple media (e.g., a centralized or distributed database, and/or associated caches and servers) configured to store the instructions 824.

An apparatus of the machine 800 may be one or more of a hardware processor 802 (e.g., a central processing unit (CPU), a graphics processing unit (GPU), a hardware processor core, or any combination thereof), a main memory 804 and a static memory 806, one or more sensors 821, network interface device 820, one or more antennas 860, a display device 810, an input device 812, a UI navigation device 814, a mass storage device 816, instructions 824, a signal generation device 818, and an output controller 828. The apparatus may be configured to perform one or more of the methods and/or operations disclosed herein. The apparatus may be intended as a component of the machine 800 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine-readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine-readable media may include non-transitory machine-readable media. In some examples, machine-readable media may include machine-readable media that is not a transitory propagating signal.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 820 may include one or more physical jacks (e.g., Ethernet, coaxial, or phone jacks) or one or more antennas to connect to the communications network 826. In an example, the network interface device 820 may include one or more antennas 860 to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques. The term "transmission medium" shall be taken to include any intangible medium that is capable of storing, encoding or carrying instructions for execution by the machine 800, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Example 1 is a method, comprising: collecting, from a plurality of access points, communication statistics of network communications occurring over a plurality of uniquely identified VLANs; categorizing each of the VLANs based on the communication statistics, the categorizing assigning a first category to a first VLAN of the plurality of uniquely identified VLANs; detecting errors in second network communications on the first VLAN at a first AP of the plurality of access points, the first AP configured to forward traffic of the first VLAN to a port on a network component; determining a second category of the second network communications; third determining whether the port is misconfigured based on whether the first category is consistent with the second category; and generating an output indicating whether the port is misconfigured.

In Example 2, the subject matter of Example 1 optionally includes providing features derived from the collected communication statistics to a machine learning model, wherein the categorizing of each of the VLANs is based on the machine learning model.

In Example 3, the subject matter of Example 2 optionally includes determining an indication of network traffic consistency of the first VLAN based on the collected communication statistics, and providing the indication to the machine learning model.

In Example 4, the subject matter of any one or more of Examples 2-3 optionally includes determining a data throughput indication of the first VLAN based on the collected communication statistics, and providing the data throughput indication to the machine learning model.

In Example 5, the subject matter of any one or more of Examples 2-4 optionally includes determining a packet throughput of the first VLAN based on the collected communication statistics, and providing the packet throughput to the machine learning model.

In Example 6, the subject matter of any one or more of Examples 2-5 optionally includes determining a site location of the first AP, and providing the site location to the machine learning model.

In Example 7, the subject matter of any one or more of Examples 1-6 optionally includes wherein categorizing each of the VLANs comprises categorizing the first VLAN as a blackhole VLAN, and wherein the third determining comprises determining that the network component is not misconfigured based on the first VLAN being categorized as a blackhole VLAN.

In Example 8, the subject matter of any one or more of Examples 1-7 optionally includes wherein categorizing each of the VLANs comprises categorizing the first VLAN as a site-specific VLAN, and determining whether a site of the first AP is consistent with the site-specific VLAN, and wherein the third determining comprises determining that the network component is misconfigured based on the first VLAN being categorized as a site-specific VLAN and determining that the site of the first AP is consistent with the site-specific VLAN.

In Example 9, the subject matter of any one or more of Examples 1-8 optionally includes wherein categorizing each of the VLANs comprises categorizing the first VLAN as a site-specific VLAN, and determining whether a site of the first AP is inconsistent with the site-specific VLAN, and wherein the third determining comprises determining the network component is misconfigured based on the first VLAN being categorized as a site-specific VLAN and the site of the first AP being inconsistent with the site-specific VLAN.

In Example 10, the subject matter of any one or more of Examples 1-9 optionally includes wherein generating the output comprises programmatically reconfiguring the network component based on the network component being misconfigured.

Example 11 is a system, comprising: hardware processing circuitry; one or more hardware memories storing instructions that configure the hardware processing circuitry to perform operations comprising: collecting, from a plurality of access points, communication statistics of network communications occurring over a plurality of uniquely identified VLANs; categorizing each of the VLANs based on the communication statistics, the categorizing assigning a first category to a first VLAN of the plurality of uniquely identified VLANs; detecting errors in second network communications on the first VLAN at a first AP of the plurality of access points, the first AP configured to forward traffic of the first VLAN to a port on a network component; determining a second category of the second network communications; third determining whether the port is misconfigured based on whether the first category is consistent with the second category; and generating an output indicating whether the port is misconfigured.

In Example 12, the subject matter of Example 11 optionally includes the operations further comprising providing features derived from the collected communication statistics to a machine learning model, wherein the categorizing of each of the VLANs is based on the machine learning model.

In Example 13, the subject matter of Example 12 optionally includes the operations further comprising determining an indication of network traffic consistency of the first VLAN based on the collected communication statistics, and providing the indication to the machine learning model.

In Example 14, the subject matter of any one or more of Examples 12-13 optionally includes the operations further comprising determining a data throughput indication of the first VLAN based on the collected communication statistics, and providing the data throughput indication to the machine learning model.

In Example 15, the subject matter of any one or more of Examples 12-14 optionally includes the operations further comprising determining a packet throughput of the first VLAN based on the collected communication statistics, and providing the packet throughput to the machine learning model.

In Example 16, the subject matter of any one or more of Examples 12-15 optionally includes the operations further comprising determining a site location of the first AP, and providing the site location to the machine learning model.

In Example 17, the subject matter of any one or more of Examples 11-16 optionally includes wherein categorizing each of the VLANs comprises categorizing the first VLAN as a blackhole VLAN, and wherein the third determining comprises determining that the network component is not misconfigured based on the first VLAN being categorized as a blackhole VLAN.

In Example 18, the subject matter of any one or more of Examples 11-17 optionally include wherein categorizing each of the VLANs comprises categorizing the first VLAN as a site-specific VLAN, and determining whether a site of the first AP is consistent with the site-specific VLAN, and wherein the third determining comprises determining the network component is misconfigured based on the first VLAN being categorized as a site-specific VLAN and determining that the site of the first AP is consistent with the site-specific VLAN.

In Example 19, the subject matter of any one or more of Examples 11-18 optionally includes wherein categorizing each of the VLANs comprises categorizing the first VLAN as a site-specific VLAN, and determining whether a site of the first AP is inconsistent with the site-specific VLAN, and wherein the third determining comprises determining the network component is misconfigured based on the first VLAN being categorized as a site-specific VLAN and the site of the first AP being inconsistent with the site-specific VLAN.

In Example 20, the subject matter of any one or more of Examples 11-19 optionally includes wherein generating the output comprises programmatically reconfiguring the network component based on the network component being misconfigured.

Example 21 is a non-transitory computer-readable storage medium comprising instructions that when executed configure hardware processing circuitry to perform operations comprising: collecting, from a plurality of access points, communication statistics of network communications occurring over a plurality of uniquely identified VLANs; categorizing each of the VLANs based on the communication statistics, the categorizing assigning a first category to a first VLAN of the plurality of uniquely identified VLANs; detecting errors in second network communications on the first VLAN at a first AP of the plurality of access points, the first AP configured to forward traffic of the first VLAN to a port on a network component; determining a second category of the second network communications; third determining whether the port is misconfigured based on whether the first category is consistent with the second category; and generating an output indicating whether the port is misconfigured.

In Example 22, the subject matter of Example 21 optionally includes the operations further comprising providing features derived from the collected communication statistics to a machine learning model, wherein the categorizing of each of the VLANs is based on the machine learning model.

In Example 23, the subject matter of Example 22 optionally includes the operations further comprising determining an indication of network traffic consistency of the first VLAN based on the collected communication statistics, and providing the indication to the machine learning model.

In Example 24, the subject matter of any one or more of Examples 22-23 optionally includes the operations further comprising determining a data throughput indication of the first VLAN based on the collected communication statistics, and providing the data throughput indication to the machine learning model.

In Example 25, the subject matter of any one or more of Examples 22-24 optionally includes the operations further comprising determining a packet throughput of the first VLAN based on the collected communication statistics, and providing the packet throughput to the machine learning model.

In Example 26, the subject matter of any one or more of Examples 22-25 optionally includes the operations further comprising determining a site location of the first AP, and providing the site location to the machine learning model.

In Example 27, the subject matter of any one or more of Examples 21-26 optionally includes wherein categorizing each of the VLANs comprises categorizing the first VLAN as a blackhole VLAN, and wherein the third determining comprises determining the network component is not misconfigured based on the first VLAN being categorized as a blackhole VLAN.

In Example 28, the subject matter of any one or more of Examples 21-27 optionally includes wherein categorizing each of the VLANs comprises categorizing the first VLAN as a site-specific VLAN, and determining whether a site of the first AP is consistent with the site-specific VLAN, and wherein the third determining comprises determining the network component is misconfigured based on the first VLAN being categorized as a site-specific VLAN and determining that the site of the first AP is consistent with the site-specific VLAN.

In Example 29, the subject matter of any one or more of Examples 21-28 optionally includes wherein categorizing each of the VLANs comprises categorizing the first VLAN as a site-specific VLAN, and determining whether a site of the first AP is inconsistent with the site-specific VLAN, and wherein the third determining comprises determining the network component is misconfigured based on the first VLAN being categorized as a site-specific VLAN and the site of the first AP being inconsistent with the site-specific VLAN.

In Example 30, the subject matter of any one or more of Examples 21-29 optionally include wherein generating the output comprises programmatically reconfiguring the network component based on the network component being misconfigured.

The invention claimed is:
1. A system, comprising:
hardware processing circuitry; and
one or more hardware memories comprising instructions that configure the hardware processing circuitry to:
categorize a first set of network traffic communicated between a plurality of access points (APs) and a network component over a virtual local area network (VLAN);
based on detecting one or more errors in a second set of network traffic communicated over the VLAN, categorize the second set of network traffic communicated between a particular AP of the plurality of APs and the network component over the VLAN;

based on a comparison of the categorization of the second set of network traffic and the categorization of the first set of network traffic, detect a misconfiguration of the VLAN associated with the particular AP and the network component; and based on the detected misconfiguration of the VLAN associated with the particular AP and the network component, perform an action.

2. The system of claim 1, wherein to detect the misconfiguration of the VLAN associated with the particular AP and the network component, the instructions configure the hardware processing circuitry to:

detect a misconfiguration of the VLAN at the particular AP.

3. The system of claim 2, wherein to perform the action, the instructions configure the hardware processing circuitry to:

automatically reconfigure the particular AP to mitigate the misconfiguration of the VLAN at the particular AP.

4. The system of claim 1, wherein to perform the action, the instructions configure the hardware processing circuitry to:

generate a notification identifying the detected misconfiguration of the VLAN at the particular AP.

5. The system of claim 4, wherein the notification includes a recommended action including one or more of changing a cable configuration between the particular AP and the network component or changing a VLAN configuration for the particular AP.

6. The system of claim 1, wherein to detect misconfiguration of the VLAN associated with the particular AP and the network component, the instructions configure the hardware processing circuitry to:

detect misconfiguration of a port associated with the VLAN.

7. The system of claim 1, wherein to categorize the first set of network traffic, the instructions configure the hardware processing circuitry to categorize the first set of network traffic as one of continuous traffic, intermittent traffic, site-specific traffic, or unauthenticated traffic; and wherein to categorize the second set of network traffic, the instructions configure the hardware processing circuitry to categorize the second set of network traffic as one of continuous traffic, intermittent traffic, site-specific traffic, or unauthenticated traffic.

8. The system of claim 7, wherein the instructions further configure the hardware processing circuitry to automatically reconfigure, based on the first set of network traffic categorized as unauthenticated traffic and the second set of network traffic categorized as unauthenticated traffic, a backend component configured to forward traffic provided by the particular AP over the VLAN to a pre-assigned VLAN designated for unauthenticated wireless clients.

9. The system of claim 1, wherein the VLAN is a site-specific VLAN, wherein the instructions further configure the hardware processing circuitry to determine whether a site associated with the particular AP is consistent with the site-specific VLAN.

10. A method comprising:

categorizing, by one or more hardware processors, a first set of network traffic communicated between a plurality of access points (APs) and a network component over a virtual local area network (VLAN);

based on detecting one or more errors in a second set of network traffic communicated over the VLAN, categorizing, by the one or more hardware processors, the second set of network traffic communicated between a particular AP of the plurality of APs and the network component over the VLAN;

based on a comparison of the categorization of the second set of network traffic and the categorization of the first set of network traffic, detecting, by the one or more hardware processors, a misconfiguration of the VLAN associated with the particular AP and the network component; and based on the detected misconfiguration of the VLAN associated with the particular AP and the network component, performing, by the one or more hardware processors, an action.

11. The method of claim 10, wherein detecting the misconfiguration of the VLAN associated with the particular AP and the network component comprises detecting a misconfiguration of the VLAN at the particular AP.

12. The method of claim 11, wherein performing the action comprises automatically reconfiguring the particular AP to mitigate the misconfiguration of the VLAN at the particular AP.

13. The method of claim 10, wherein performing the action comprises generating a notification identifying the detected misconfiguration of the VLAN at the particular AP.

14. The method of claim 13, wherein the notification includes a recommended action including one or more of changing a cable configuration between the particular AP and the network component or changing a VLAN configuration for the particular AP.

15. The method of claim 10, wherein detecting misconfiguration of the VLAN associated with the particular AP and the network component comprises detecting misconfiguration of a port associated with the VLAN.

16. The method of claim 10, further comprising:

wherein categorizing the first set of network traffic comprises categorizing the first set of network traffic as one of continuous traffic, intermittent traffic, site-specific traffic, or unauthenticated traffic; and wherein categorizing the second set of network traffic comprises categorizing the second set of network traffic as one of continuous traffic, intermittent traffic, site-specific traffic, or unauthenticated traffic.

17. The method of claim 16, further comprising:

automatically reconfiguring, by the one or more hardware processors and based on the first set of network traffic categorized as unauthenticated traffic and the second set of network traffic categorized as unauthenticated traffic, a backend component configured to forward traffic provided by the particular AP over the VLAN to a pre-assigned VLAN designated for unauthenticated wireless clients.

18. The method of claim 10, wherein the VLAN is a site-specific VLAN, the method further comprising determining, by the one or more hardware processors, whether a site associated with the particular AP is consistent with the site-specific VLAN.

19. Non-transitory computer-readable storage media comprising instructions that when executed configure hardware processing circuitry to perform operations comprising:

Categorizing a first set of network traffic communicated between a plurality of access points (APs) and a network component over a virtual local area network (VLAN);

based on detecting one or more errors in a second set of network traffic communicated over the VLAN, categorizing the second set of network traffic communicated between a particular AP of the plurality of APs and the network component over the VLAN;

based on a comparison of the categorization of the second set of network traffic and the categorization of the first set of network traffic, detecting a misconfiguration of the VLAN associated with the particular AP and the network component; and based on the detected misconfiguration of the VLAN associated with the particular AP and the network component, performing an action.

* * * * *